Sept. 30, 1958 F. BRINDLEY ET AL 2,854,055

PIPE-BENDING MACHINES WITH SWIVELED HEAD AND HAVING AN OSCILLATABLE STOP BAR WITH CAM TO RETRACT MANDREL

Filed Feb. 9, 1955 9 Sheets-Sheet 1

INVENTORS
Frederick Brindley and George Locks
BY
Michael S. Striker
ATTORNEY

Sept. 30, 1958 F. BRINDLEY ET AL 2,854,055

PIPE-BENDING MACHINES WITH SWIVELED HEAD AND HAVING AN OSCILLATABLE STOP BAR WITH CAM TO RETRACT MANDREL

Filed Feb. 9, 1955 9 Sheets-Sheet 2

INVENTORS
Frederick Brindley and George Wolf
BY
Michael S. Striker
ATTORNEY

Sept. 30, 1958 F. BRINDLEY ET AL 2,854,055

PIPE-BENDING MACHINES WITH SWIVELED HEAD AND HAVING AN OSCILLATABLE STOP BAR WITH CAM TO RETRACT MANDREL

Filed Feb. 9, 1955 9 Sheets-Sheet 3

INVENTORS
Frederick Brindley and George Woods
BY
Michael S. Striker
ATTORNEY

INVENTORS
Frederick Brindley and George Looks
BY
Michael S. Striker
ATTORNEY

Sept. 30, 1958 F. BRINDLEY ET AL 2,854,055
PIPE-BENDING MACHINES WITH SWIVELED HEAD AND
HAVING AN OSCILLATABLE STOP BAR WITH CAM
TO RETRACT MANDREL
Filed Feb. 9, 1955 9 Sheets-Sheet 5

INVENTORS
Frederick Brindley and George Locke
BY
Michael S. Striker
ATTORNEY

Sept. 30, 1958 F. BRINDLEY ET AL 2,854,055

PIPE-BENDING MACHINES WITH SWIVELED HEAD AND HAVING AN OSCILLATABLE STOP BAR WITH CAM TO RETRACT MANDREL

Filed Feb. 9, 1955 9 Sheets-Sheet 6

INVENTORS
Frederick Brindley
and George Lock.
BY
Michael S. Striker
ATTORNEY

PIPE-BENDING MACHINES WITH SWIVELED HEAD AND HAVING AN OSCILLATABLE STOP BAR WITH CAM TO RETRACT MANDREL

Filed Feb. 9, 1955

INVENTORS
Frederick Brindley and George Wicks
BY
Michael S. Striker
ATTORNEY

Sept. 30, 1958 F. BRINDLEY ET AL 2,854,055

PIPE-BENDING MACHINES WITH SWIVELED HEAD AND HAVING AN OSCILLATABLE STOP BAR WITH CAM TO RETRACT MANDREL

Filed Feb. 9, 1955 9 Sheets-Sheet 8

INVENTORS
Frederick Brindley
and George Locks
BY
Michael S. Striker
ATTORNEY

PIPE-BENDING MACHINES WITH SWIVELED HEAD AND HAVING AN OSCILLATABLE STOP BAR WITH CAM TO RETRACT MANDREL
Filed Feb. 9, 1955

INVENTORS
Frederick Brindley
and George Locke
BY
Michael S. Striker
ATTORNEY

United States Patent Office 2,854,055

Patented Sept. 30, 1958

2,854,055

PIPE-BENDING MACHINES WITH SWIVELED HEAD AND HAVING AN OSCILLATABLE STOP BAR WITH CAM TO RETRACT MANDREL

Frederick Brindley, Heaton Norris, Stockport, and George Cocks, Gorton, Manchester, England Application February 9, 1955, Serial No. 487,026

3 Claims. (Cl. 153—40)

This invention relates to pipe-bending machines, of the type comprising a guide for the pipe, an angularly-movable member mounted at one end of said guide with means for clamping the pipe thereto, and a forming tool of appropriate effective radius around which the pipe is bent on operation of said member.

The object of the present invention is to provide an improved machine of the type aforesaid which will enable pipes to be bent much more accurately and quickly than has been possible hitherto, irrespective of the size of the pipe under treatment and the nature of the metal from which it is made, the advantages of the construction hereinafter described being particularly apparent when successive bends are required to be made in different planes.

According to this invention, the improved machine comprises a head including a circumferentially grooved roller having an arcuate forming surface for bending the pipe; another grooved roller for supporting the opposite side of the pipe; a support supporting said head for rotation about an axis adapted to coincide with the axis of the pipe so that successive bends can be formed in different planes and directions; a collet chuck for maintaining the clamped position of the unworked portion of the pipe during rotation of said head between said successive bends; a carrier for said collet chuck; rail means for guiding said carrier for movement in axial direction of said head during advancement of the pipe; an angularly movable bar extending parallel to said rail means; adjustable stops mounted on said bar for indicating the desired position of each bend in relation to selected portions of the pipe, said stops being rendered inoperative by angular movement of said bar; a movable mandrel adapted to project into the unworked portion of the pipe; and cam means controlling the movement of said mandrel, said cam means being connected to said stop bar and actuated by movement of the same.

In the accompanying drawings:

Fig. 1*a* is a part-sectional side elevation of one form of the improved pipe-bending machine and Fig. 1*b* is a continuation of Fig. 1*a*.

Figs. 2*a* and 2*b* constitute a plan view of the embodiments of Figs. 1*a*, 1*b*.

Figure 10:
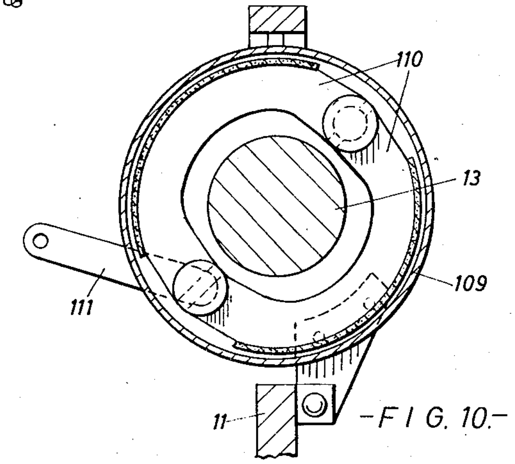
Figure 8A:
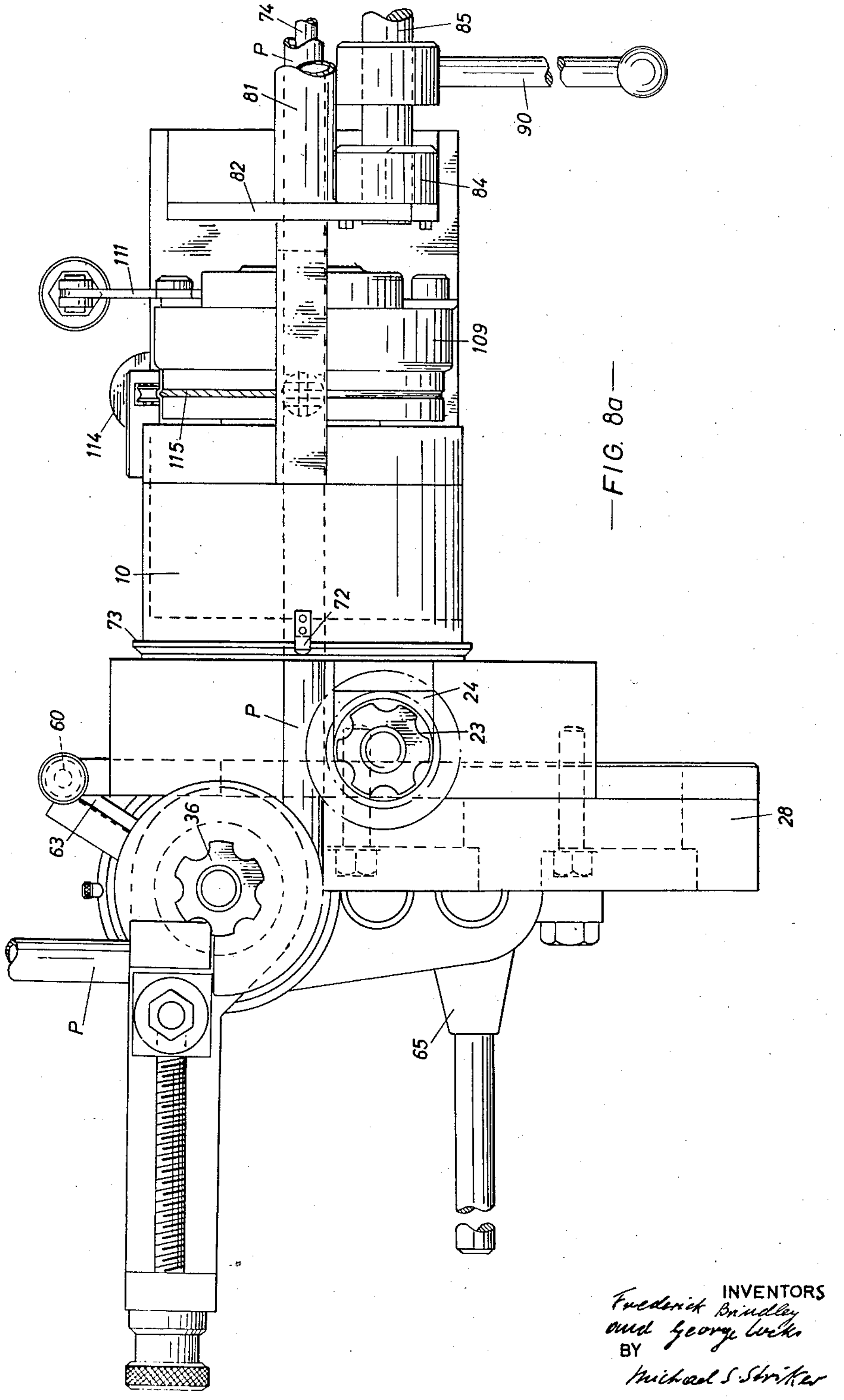
Figure 8B:
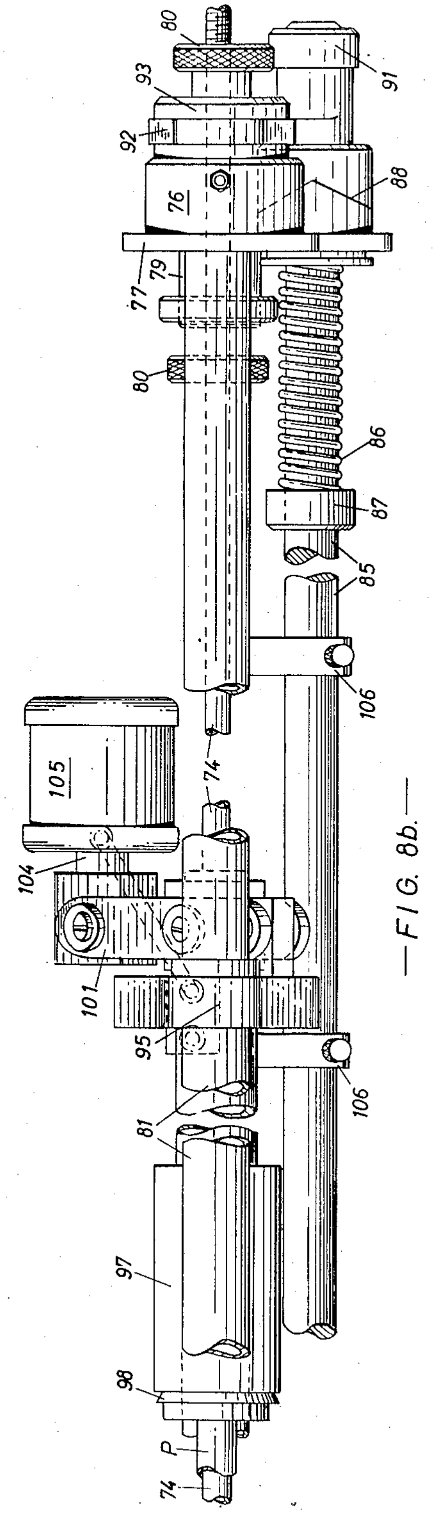
Figure 9:
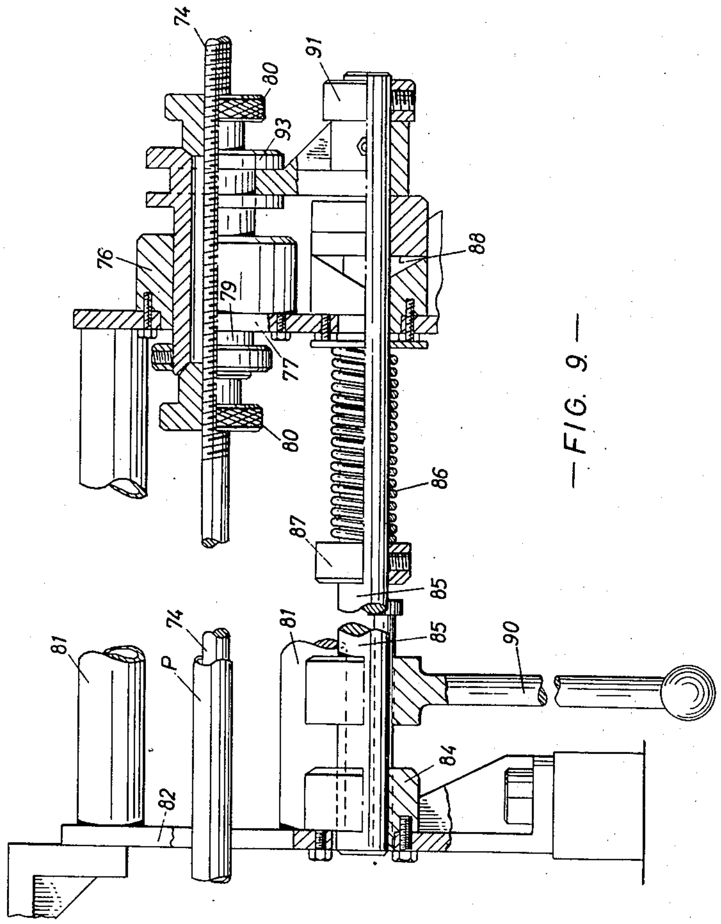

Figs. 8*a* and 8*b* constitute a plan view of the machine shown in the position after completion of a bend;

Fig. 9 is a side elevation, partly in section, showing certain parts in a retracted position; and Fig. 10 is a cross-sectional view of a brake used in the machine.

In the example illustrated, the invention is applied to a machine suitable for bending pipes of between ¾ inch and 1½ inches in outside diameter, the body of such machine comprising a cup-shaped housing 10 which is fixed upon a fabricated pedestal or other support 11 and which contains a roller thrust-race 12 having a hollow head 13 journalled therein with its axis horizontal.

The bearing 12 is engaged between a circumferential flange 14 on the head 13 and the closed end of the housing 10, which latter is apertured at 15 to allow the head to project therethrough and to carry a lock-nut 16, a ball thrust-race 17 being interposed between such nut and the exterior of the housing 10.

The outer face of the head flange 14, which is preferably flush with the adjacent end of the housing 10, has permanently or otherwise fixed thereto a metal block 18 having a flat face 19 disposed parallel to a diameter of the head 13 but offset relatively to the axis of the latter.

A metal roller 20, having a circumferential groove 21 with a semi-circular cross-section suited to the diameter of the pipe to be bent, is supported upon the block face 19 aforesaid and rotates upon a pin 22 so positioned that the axis of the head 13 is tangential to the axis of the grooved periphery of the roller 20. This pin 22 preferably has an enlarged head 23 and may be passed through a steady bracket 24 which is secured to the head flange 14 at the side of the roller 20 remote from block 18.

The outer face 25 of the support block 18 (i. e. the face remote from the spindle 13) is formed with a groove 26 extending at right angles to the axis of the roller 20, said groove being engaged by a feather 27 on an adjustable block 28, this latter being secured to the support block 18 by set-screws 29 which enable it to be fixed at any desired position along the groove 26.

The adjustable block 28 is engaged between spaced lugs 30 at one end of a bending arm 31 which is adapted to pivot upon a short shaft 32 passed through the assembly in a direction parallel to the axis of the roller 20. One of these lugs 30 lies somewhat below the roller-carrying face 19 of the support block 18 and itself carries a second similar roller 33 which has a circumferential groove 34 twice the depth of the groove 21 in the roller 20, but of the same width and of the same radius at its base.

This roller 33 (hereinafter termed the "forming roller" to distinguish it from the "back-pressure roller" 20 on the support block 18) is located upon a projecting end 35 of the shaft 32 by means of a hand-nut 36.

The adjacent face 37 of the bending arm 31 has a longitudinal inverted T slot 38 accommodating a feather 39 on a vice-jaw 40 which is locatable at any desired position along the length of the slot by means of a clamping bolt 41 whose head engages in the latter. Fine adjustment of this jaw 40 may be effected by means of a manually-operable lead-screw 42 journalled in a bearing block 43 at the outer end of the slot 38, and extending longitudinally of the latter to engage a tapped hole 44 in the head of the clamping bolt 41.

The vice-jaw 40, and a coacting jaw 45 fixed in the periphery of the forming roller 33, are formed at their mutually-opposed faces with identical grooves 46 each of segmental section and of the same base radius as the circumferential grooves 21, 34 in the rollers 20, 33 respectively.

The roller grooves 21, 34 and vice-jaw grooves 46 are maintained at a common level by interposing between the forming roller 33 and the surface 37 the flange 47 of a bush 48 mounted in the adjacent lug 30. A similar flanged bush 49 is mounted in the companion lug 30, and these bushes respectively engage with spaced eccentrics 50 provided on the shaft 32, whose intermediate portion engages a bush 51 in the adjustable block 28 (see Figs. 5 and 4).

Figure 1A:
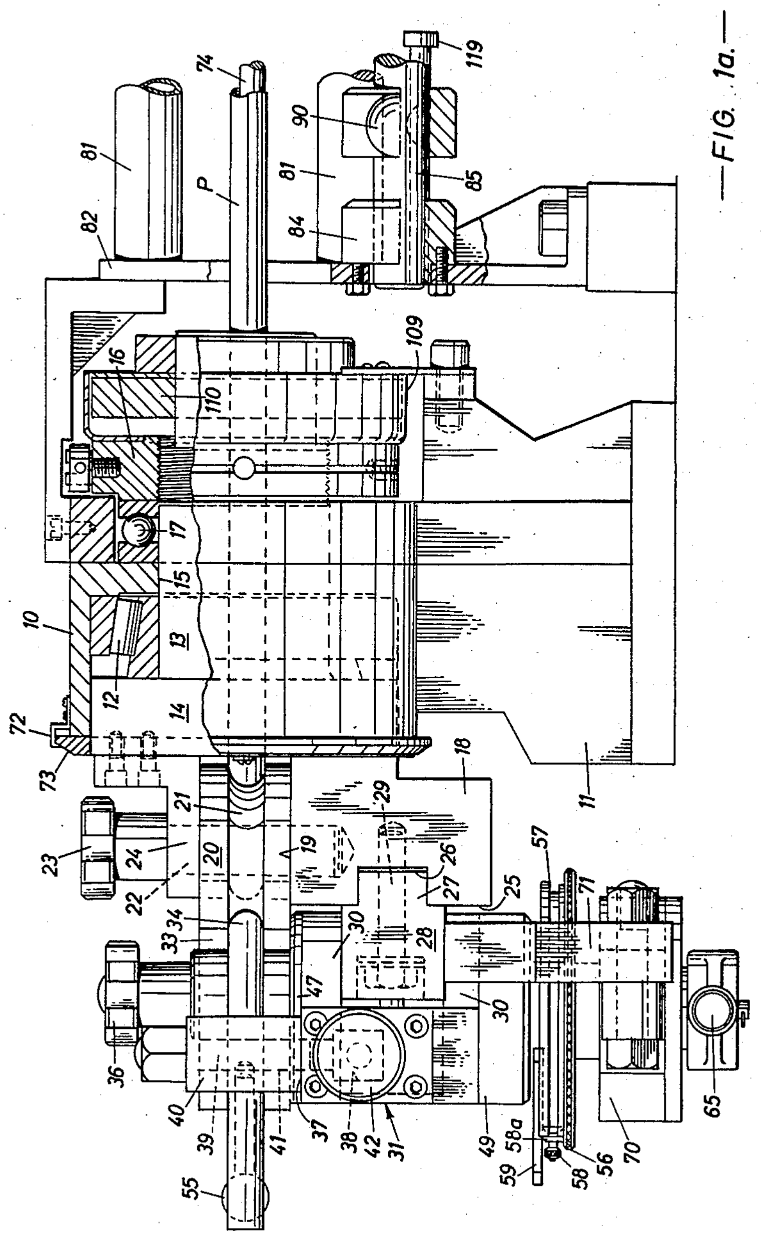
Figure 3:
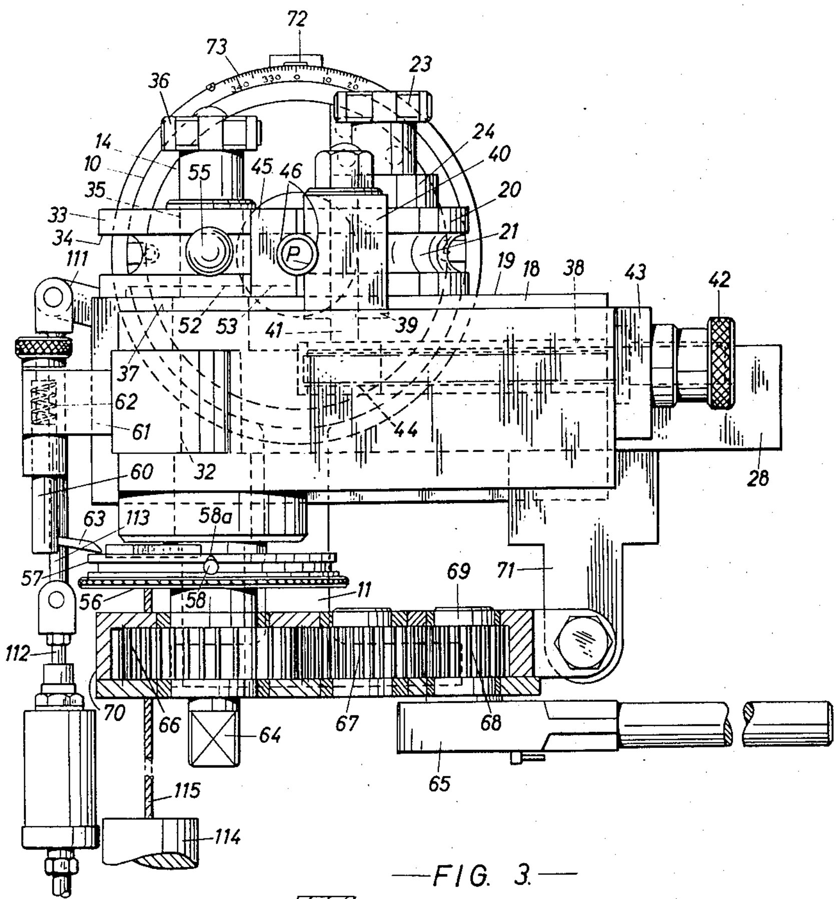
Fig. 3 is a left end elevation of the same.

The forming roller 33 is formed at its underside with a concentric recess 52 to accommodate a dog 53, fixed transversely of the shaft end 35 and adapted to co-operate with diametrically-opposed pins 54 upstanding from the flange 47 of the adjacent bush 48. A radially disposed handle 55, see Figs. 1*a* and 3, is provided in roller 33, and normally lies along the vice jaw 45.

At the side of the bending arm 31 remote from the forming roller 33, the shaft 32 has fixed thereto a disc 56 on which is rotatably mounted a ring 57 graduated from 0° to 180°. The angular location of this ring with reference to the disc 56 is effected by means of at least one knurled cap-nut 58 on a screw whose head is of dove-tail form for engagement with the undercut groove in disc 56. Member 58 is associated with an adjustable marker **58*a*. Fixed to the ring 57 is a radial lug 59 adapted to co-operate with a stop member 60 carried by a bracket 61 on the adjustable block 28, and preferably slidable in such bracket against the action of a spring 62 so that it can be retracted clear of the lug 59 when necessary. A pointer 63 on the stop 60 co-operates with the graduations on the ring 57**.

At the end remote from the forming roller 33 the shaft 32 is made of non-circular section, as at 64, for engagement by a suitable actuating handle 65, preferably of ratchet type.

Between this non-circular end 64 and the disc 56 the shaft 32 may have fixed thereto a gearwheel 66 meshing with a second gear 67 which in turn engages a pinion 68 on a short shaft 69 adapted for alternative actuation by the handle 65. This gearing is conveniently enclosed within a two-part casing 70 anchored to a dependent bracket 71 on the adjustable block 28.

The angular relationship of the bending assembly to the stationary body 10 of the machine is adjustable by rotation of the head 13 in its bearings 12, 17, and is indicated by a pointer 72 on the body co-operating with an annular scale 73, graduated from 0° to 360°, which is carried by the head flange 14.

The pipe P to be bent is supported internally by means of a ball-nosed mandrel 74 disposed coaxially with the rotary head 13 and normally extending to a position opposite the centre of the forming roller 33.

Figure 1B:
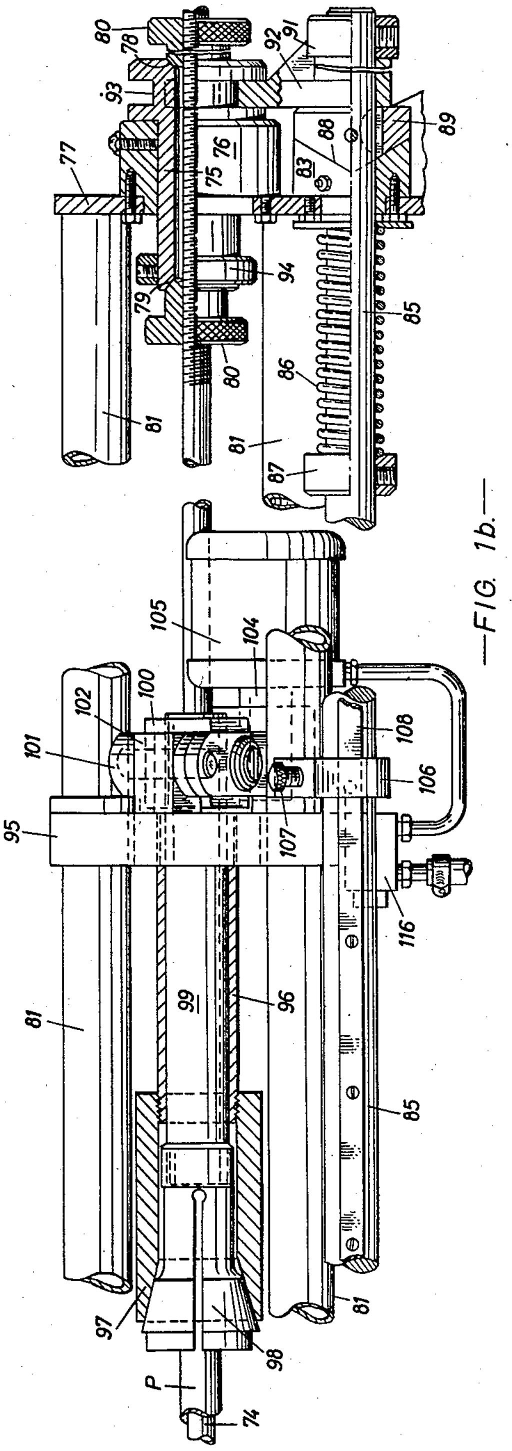
Figure 2A:
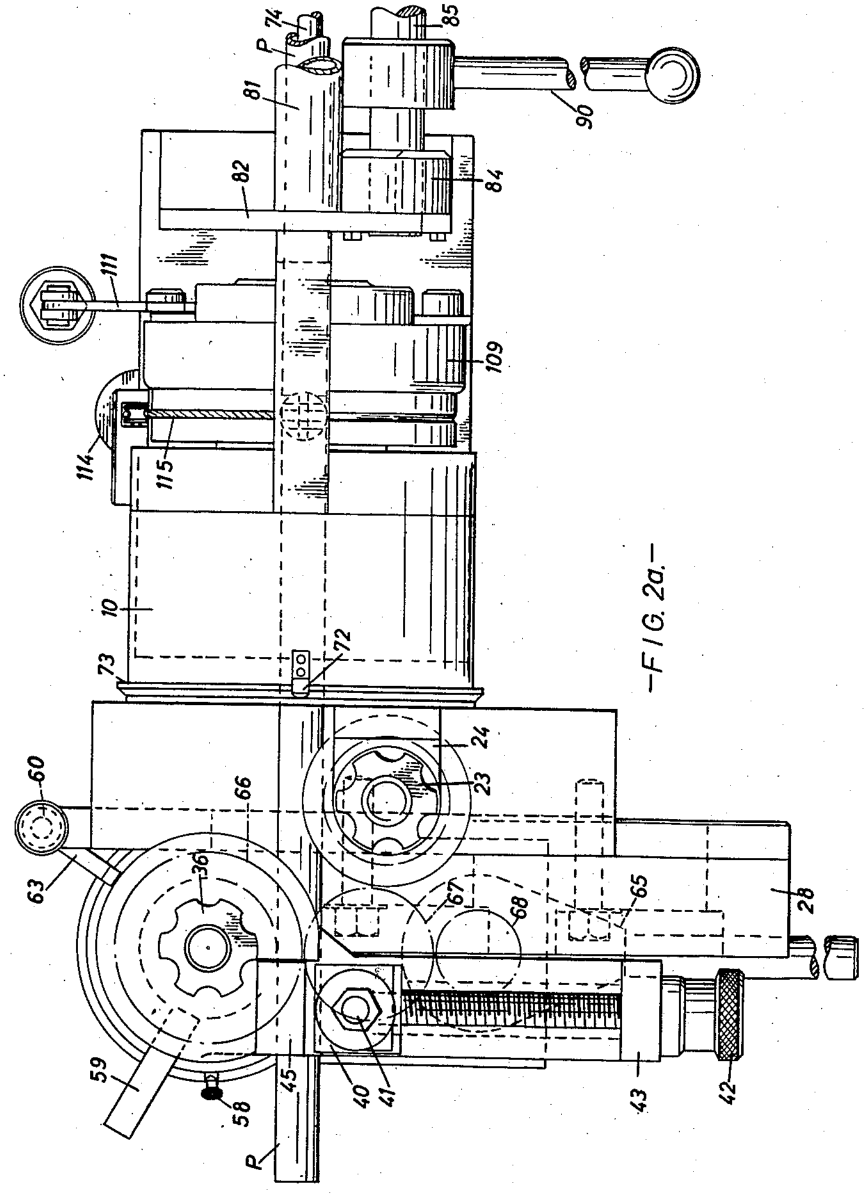
Figure 2B:
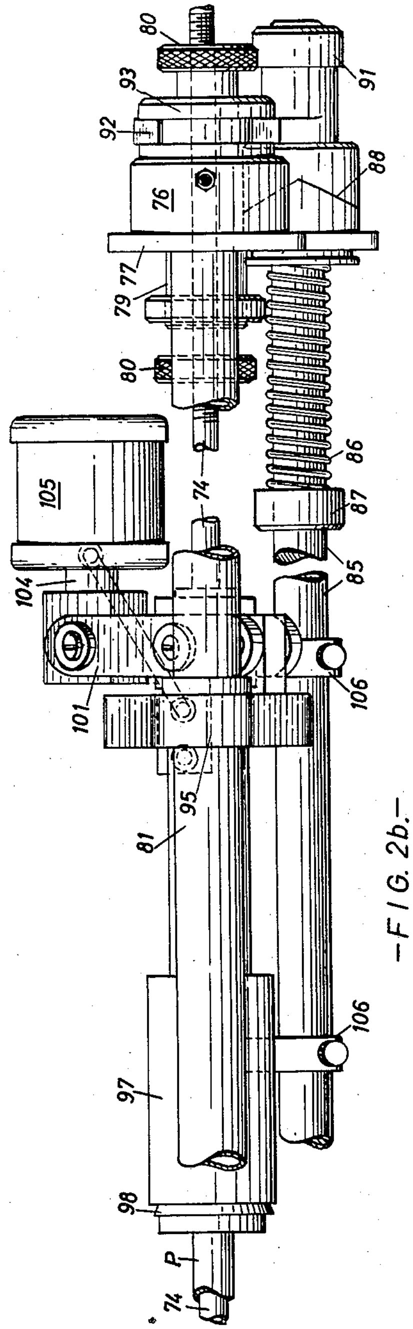

Also coaxial with the rotary head 13, but suitably spaced therefrom in a longitudinal direction, is a sleeve 75 freely rotatable, as well as slidable, in a bush 76 fixed to a vertical supporting plate 77 (Fig. 1*b*). The ends of this sleeve 75 are chamfered internally, as at 78, to receive complementary chamfers 79 on hand-nuts 80 on the threaded outer end of the mandrel 74. These nuts 80, as will be appreciated, serve to centralize the mandrel as well as permitting endwise adjustment thereof.

The plate 77 is connected, by two tubular or other rails 81 disposed parallel to the mandrel 74 and respectively above and below the latter, to a similar plate 82 fixed immediately adjacent the head (see Figs. 1*a* and 1*b*).

Slidably and rotatably mounted in bushes 83, 84 carried by the plates 77, 82, respectively, is a length-stop bar 85 disposed parallel to, but somewhat below, the lower rail 81, such bar being urged towards the rotary head 13 by means of a spring 86 compressed between a collar 87 secured to bar 85, and the plate 77.

At the end remote from this spring 86 the bush 83 is formed with a diametral V notch 88 or otherwise provided with cam faces which co-operate with complementary formations on a member 89 fixed to the bar 85.

On rotation of the bar 85 by means of a handle 90 fixed thereto adjacent the plate 82, the coacting cam faces of the members 83, 89 effect endwise movement of the bar against the action of the spring 86 and in a direction away from the rotary head 13. Freely mounted upon the bar 85 between a collar 91 and the member 89 is a fork 92 engaging a circumferential groove 93 in the sleeve 75, so that said endwise movement of bar 85 moves sleeve 75 endwise until a collar 94 thereon engages the plate 77, with a corresponding retraction of the mandrel 74 through the medium of the nuts 80.

Slidably guided upon the rails 81 between their supporting plates 77, 82 is a traveller 95 (Figs. 1*b*, 6 and 7) to which is fixed a tube 96 concentric with the mandrel 74 and carrying at its outer end an internally coned sleeve 97 which embraces a spring collet 98. This latter is fixed to an inner tube 99 slidable within the tube 96 and projecting through the traveller 95 to carry a block 100. Twin levers 101 pivoted to a lug 102 on the traveller 95 are engaged by opposed trunnions 103 on the block 100 and acted upon at their free ends by a plunger 104 working in a pneumatic or hydraulic cylinder 105. When the ends of levers 101 are pivoted away from traveller 95, tube 99, and spring collet 98 are moved axially within tube 96 and internally beveled sleeve 37, respectively, to clamp one end of pipe P. When levers 101 are pivoted to move members 103, 100, 99 and 98 axially to open position shown in Figs. 1*b* and 7, said end of pipe P is unclamped and can be removed from the machine, or another pipe inserted.

The traveller 95 is adapted to co-operate, as hereafter described, with at least one length-stop 106 adjustable along the bar 85 and clampable by means of a screw 107 at any desired point along scale 108 fixed to such bar.

Finally there is provided, at the end of the head 13 remote from the rollers 20, 33, a stationary brake drum 109 containing mutually-hinged shoes 110 which embrace the mandrel 74 and whose free ends are connected by a lever 111 so as to engage the interior of the drum 109 until the lever is moved by operation of a suitable control such as a foot pedal, not shown. This latter may act through the medium of a pneumatic or hydraulic plunger 112 which is linked at 113 to the lever 111.

The offset mass of the bending assembly carried by the head 13 is preferably counter-balanced by a weight 114 on a cable 115 which is attached to the periphery of such head.

In operating the machine, a length of pipe pre-cut to the correct developed length is fed into the machine between the vice-jaws 40, 45 and rollers 20, 33, through the rotary head 13, and over the mandrel 74 until one end enters the collet 98 which is assumed to be in the open condition shown in Fig. 1*b*.

Figures 4, 5, 6, 7:
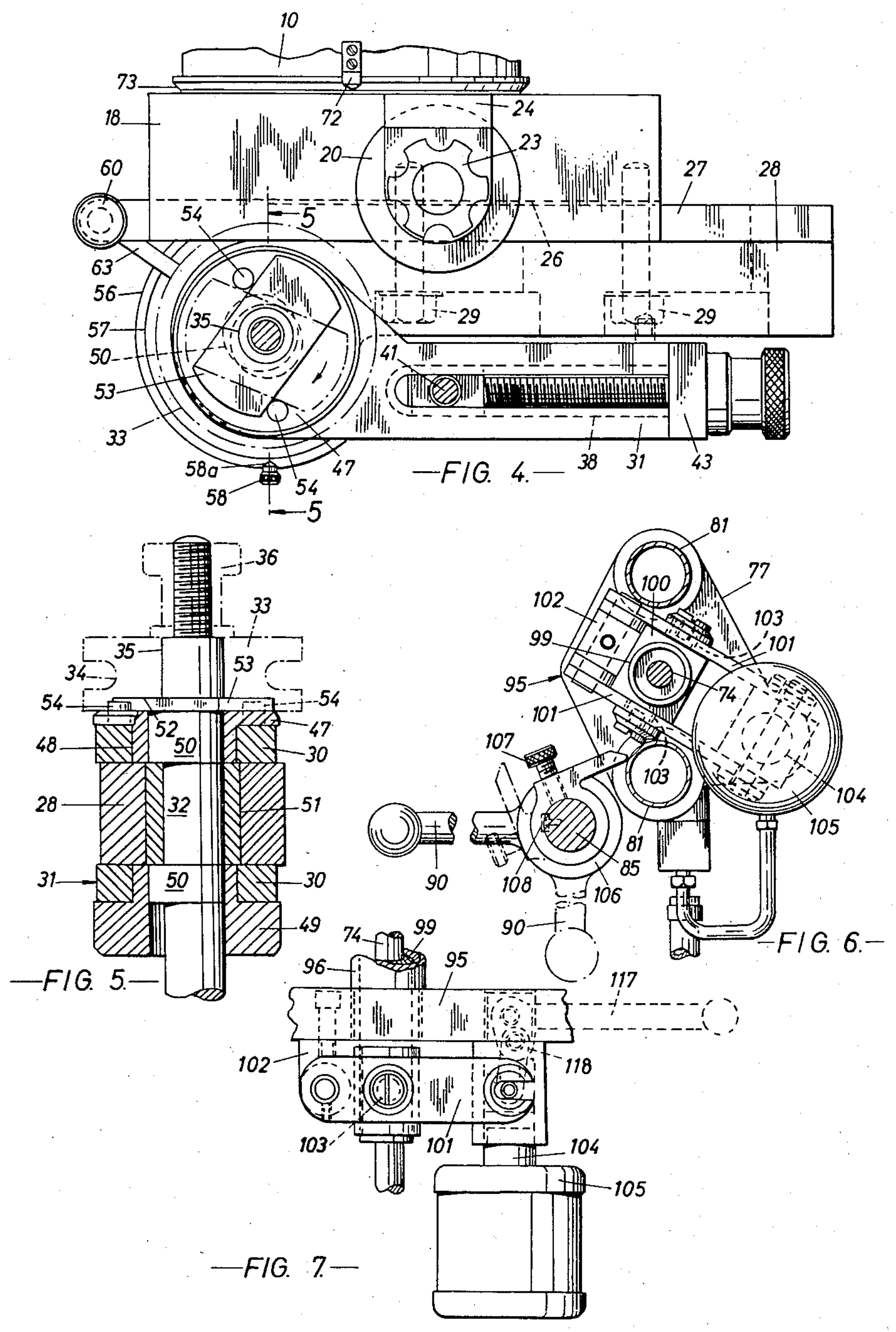
Fig. 4 is a fragmentary plan view omitting the pipe-gripping and bend-forming means shown in Figs. 1*a*, 1*b* and 3.
Fig. 5 is a section on the line 5—5 of Fig. 4.
Fig. 6 is a transverse sectional view showing the collet chuck in end elevation.
Fig. 7 is a plan view of the device shown in Fig. 6.

Entry of said pipe end into collet 98 shifts the latter and the traveller 95 whereby a button valve 116 on such traveller is allowed to open and thereby admit pressure fluid to the cylinder 105 so that tube 99 and collet 98 are moved axially by levers 101 away from the positions shown in Figs. 1*b* and 7, and said collet closes upon the pipe P. Thereafter the guide-rails 81 on which the traveller 95 slides effectively prevent rotation of the pipe P about its own axis.

The length-stops 106 are adjusted along the bar 85 to determine the position of the bends to be formed in the pipe P, the distances being measured from the tail end of the machine.

The lever 90 is then turned to the position shown in broken lines in Fig. 1*a* so as to swing the stops 106 clear of the traveller 95 and to allow the pipe P to be pulled forwards until such traveller has passed the first stop. Thereafter the bar 85 and stops 106 are restored to their original position, and the pipe P and traveller 95 are pushed back until the latter contacts the first stop 106.

Assuming the first bend is to be right-angled and right-handed, the brake-shoes 110 are disengaged from the drum 109 by operation of a control pedal, not shown, and the head 13 is turned to bring the 0° graduation on the scale 73 opposite the index 72.

To effect the actual bending operation, the arm 31 is swung forward away from the adjustable block 28 by operation of the handle 65 which acts on the shaft 32, the direction of rotation of the latter being clockwise as seen in Fig. 4.

The parts being initially in the position shown in Fig. 4 (i. e. with the vice-jaws 40, 45 open to permit loading of the pipe P), the eccentrics 50 move the bending arm 31 and jaw 40 bodily during the first quarter-turn of the shaft 32, so that the pipe P is clamped against the jaw 45 as shown in Fig. 3.

When the dog 53 reaches the position indicated in broken lines in Fig. 4 (i. e. after about 110° movement of the shaft 32), it engages the two pins 54 upstanding from the bush 48 in the bending arm 31 which is thereafter rotated, with its vice-jaw 40, about the axis of the shaft 32, and of course carries with it the other vice-jaw 45 and forming roller 33.

Being clamped to the arm 31 the pipe P is drawn forwards through the rotary head 13 and bent around the grooved periphery of the forming roller 33, the bending reaction being taken by the back-pressure roller 20 and the movement of the arm being continued until the lug 59 on the adjustable ring 57 (previously set with its 90° graduation opposite the stationary pointer 63) is brought into contact with the stop peg 60. By this time the pipe P has been bent through the desired angle, the take-up of material during the operation having caused the traveller 95 to move away from the length-stop 106. To facilitate repetition, the marker 58*a* may be placed opposite the 90° graduation aforesaid, and the angles of other lateral bends to be applied may be indicated by similar markers.

The first bend having been formed as aforesaid, the handle 65 is operated to return the shaft 32 to its original position, the dog 53 swinging between the pins 54 to the location indicated in full lines in Fig. 4 and the eccentrics 50 moving the bending arm 31 bodily endwise so that the pipe P is released by the vice-jaw 40 and arm 31 is revolved back to its starting position. To bring the coacting jaw 45 back into alignment with vice-jaw 40, the forming roller 33 is returned to its starting position by means of the handle 55.

To overcome the tendency for the mandrel 74 to cling to the pipe after the bending operation, the length-stop bar 85 is rotated, by turning the handle 90 to the position shown in dotted lines in Fig. 1*a*, the cam members 83, 89 thereupon reacting with one another so that the bar 85, sleeve 75 and mandrel 74 are bodily retracted against the thrust of the spring 86.

For the next bend, handle 90 is released, the pipe P, collet 98, tube 99, sleeve 97, tube 96 and traveler 95 are pulled forwards until the traveller 95 reaches the next stop 106 on the bar 85, and finally the handle 65 is operated to re-clamp the pipe and turn the bending arm 31 through the required angle. The advancement of the pipe P between successive bends will normally be effected manually.

Should it be desired to form this second bend in the opposite direction to the first (i. e. left-handed), the head 13 and bending assembly are turned bodily through 180° about the axis of the pipe P. This merely involves releasing the brake-shoes 110 from the drum 109, and turning the head 13 until the 180° mark on the scale 73 is aligned with the pointer 72.

A similar procedure is followed when successive bends are to be formed in different planes; i. e. the brake is released and the head 13 rotates until the required angle between the two bending planes is indicated by the reading of the scale 73 with reference to the pointer 72.

On completion of the bending cycle, the button valve 116 is opened automatically, by contact with a stud 119 on plate 82, so that the pipe P is released from the collet 98.

It has been found in practice that an unlimited number of pipes can be bent in a predetermined manner whilst maintaining a bend accuracy of within 1 degree.

It may be that, after selection of a new bending plane, the length of worked pipe protruding from the vice-jaws 40, 45 appears likely to foul the floor before the next bend has been completed, but in such an event, it is a simple matter to effect a suitable angular offsetting of the head 13 and thereafter to allow for such offsetting on the scale 73.

Alteration in pipe-bend radius merely necessitates removal of the retaining nut 36, replacement of the forming roller 33 by another of suitable diameter, and corresponding re-location of the vice-jaw 40 after slackening of the set-screws 29 which secure the adjustable block 28 to the block 18. Vice adjustment during working is, of course, readily effected by means of the lead-screw 42.

The machine above described permits repetition bending of pipes with much greater accuracy and versatility than has been possible hitherto, and the use of vulnerable templates is completely eliminated, inasmuch as the bending procedure can be carried out in a planned cycle, with the aid of a "process chart" detailing the required settings of the ring 57, head 13 and length-stops 106 for the various bends. Production is greatly expedited, since it is unnecessary periodically to withdraw the pipe from the machine for sighting purposes.

Obviously the precise construction of the machine may be varied in numerous ways within the scope of the invention.

Instead of being operated by fluid pressure as aforesaid, the axially-movable tube 99 which closes and opens the collet 98 may be selectively operated by a hand lever 117 acting through a toggle link 118 as indicated in broken lines in Fig. 7.

We claim:

1. A pipe bending machine comprising, in combination, a head including a circumferentially grooved roller having an arcuate forming surface for bending the pipe; another grooved roller for supporting the opposite sides of the pipe; a support supporting said head for rotation about an axis adapted to coincide with the axis of the pipe so that successive bends can be formed in different planes and directions; a collet chuck for maintaining the clamped position of the unworked portion of the pipe during rotation of said head between said successive bends; a carrier for said collet chuck; rail means for guiding said carrier for movement in axial direction of said head during advancement of the pipe; an angularly movable bar extending parallel to said rail means; adjustable stops mounted on said bar for indicating the desired position of each bend in relation to selected portions of the pipe, said stops being rendered inoperative by angular movement of said bar; a movable mandrel adapted to project into the unworked portion of the pipe; and cam means controlling the movement of said mandrel, said cam means being connected to said stop bar and actuated by movement of the same.

2. A pipe bending machine comprising, in combination, a head having an arcuate forming surface for bending the pipe; a support supporting said head for rotation about an axis adapted to coincide with the axis of the pipe so that successive bends can be formed in different planes and directions; a movable means for angularly locating said head relatively to the position of the unworked portion of the pipe during rotation of said head; guide means for guiding said movable means for movement in axial direction of said head during advancement of the pipe; an angularly movable member; adjustable stops mounted on said member movable along a line parallel to said guide means for indicating the desired position of each bend in relation to selected portions of the pipe, said stops being rendered inoperative by angular movement of said member; a mandrel adapted to project into the unworked portion of the pipe; and cam means controlling the movement of said mandrel, said cam means being connected to said member and actuated by movement of the same.

3. A pipe bending machine as set forth in claim 1 and including a brake including shoes for embracing said mandrel and a brake drum mounted on said head for maintaining the angular location of the rotary head in relation to the unworked portion of the pipe.

References Cited in the file of this patent

UNITED STATES PATENTS

| | | |
|---|---|---|
| 735,307 | Smith | Aug. 4, 1903 |
| 1,600,339 | Klarwasser | Sept. 21, 1926 |
| 1,949,938 | Martin | Mar. 6, 1934 |
| 2,127,185 | Parker | Aug. 16, 1938 |
| 2,306,223 | Parker | Dec. 22, 1942 |
| 2,306,224 | Parker | Dec. 22, 1942 |
| 2,312,121 | Parker | Feb. 23, 1943 |
| 2,382,745 | Powers | Aug. 14, 1945 |
| 2,454,867 | Garrett | Nov. 30, 1948 |
| 2,583,479 | Froedge | Jan. 22, 1952 |
| 2,667,202 | Froedge | Jan. 26, 1954 |

FOREIGN PATENTS

| | | |
|---|---|---|
| 627,458 | Germany | Mar. 25, 1936 |
| 683,965 | Great Britain | Dec. 10, 1952 |